United States Patent
Zhang et al.

(10) Patent No.: US 8,649,353 B2
(45) Date of Patent: Feb. 11, 2014

(54) METHOD AND APPARATUS FOR ACCESSING A RANDOM ACCESS CHANNEL BY SELECTIVELY USING DEDICATED OR CONTENTION-BASED PREAMBLES DURING HANDOVER

(75) Inventors: Guodong Zhang, Syosset, NY (US); Jin Wang, Central Islip, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 757 days.

(21) Appl. No.: 12/392,235

(22) Filed: Feb. 25, 2009

(65) Prior Publication Data

US 2009/0285180 A1    Nov. 19, 2009

Related U.S. Application Data

(60) Provisional application No. 61/033,676, filed on Mar. 4, 2008.

(51) Int. Cl.
- *H04W 4/00* (2009.01)
- *H04J 3/08* (2006.01)
- *H04W 36/00* (2009.01)

(52) U.S. Cl.
USPC .................. 370/331; 370/500; 455/436

(58) Field of Classification Search
USPC .............. 370/329, 331, 431, 252, 310.2, 328, 370/338, 395.4, 464–465; 455/436
See application file for complete search history.

(56) References Cited

U.S. PATENT DOCUMENTS

| | | | |
|---|---|---|---|
| 6,594,240 B1 * | 7/2003 | Chuah et al. | 370/328 |
| 7,804,799 B2 * | 9/2010 | Venkatachalam et al. | 370/329 |
| 7,903,818 B2 * | 3/2011 | Park et al. | 380/270 |
| 7,979,769 B2 * | 7/2011 | Chun et al. | 714/748 |
| 8,111,763 B2 * | 2/2012 | Ma et al. | 375/260 |
| 2005/0053029 A1 * | 3/2005 | Lee et al. | 370/328 |
| 2007/0206531 A1 * | 9/2007 | Pajukoski et al. | 370/329 |
| 2008/0043771 A1 * | 2/2008 | Cho et al. | 370/431 |
| 2008/0187027 A1 * | 8/2008 | Malladi | 375/135 |
| 2008/0232317 A1 * | 9/2008 | Jen | 370/329 |
| 2008/0267127 A1 * | 10/2008 | Narasimha et al. | 370/331 |
| 2008/0310395 A1 * | 12/2008 | Kashima | 370/350 |
| 2009/0103501 A1 * | 4/2009 | Farrag et al. | 370/337 |

(Continued)

FOREIGN PATENT DOCUMENTS

EP    1 511 246    3/2005

OTHER PUBLICATIONS

China Mobile, "Overload handling for Non-contention based RACH," 3GPP TSG-RAN WG2#61, R2-080751 (Feb. 11-15, 2008).

(Continued)

*Primary Examiner* — Warner Wong
(74) *Attorney, Agent, or Firm* — Volpe and Koenig, P.C.

(57) ABSTRACT

A method and apparatus for accessing a random access channel (RACH) during handover are disclosed. A handover procedure is initiated and a maximum handover interruption timer is activated. A dedicated preamble is transmitted in an attempt to access the RACH on a condition that the dedicated preamble is reserved in a current random access opportunity and the maximum handover interruption timer has not expired. A contention-based preamble is transmitted in an attempt to access the RACH on a condition that a dedicated preamble is not reserved in a current random access opportunity. If the maximum handover interruption timer has expired, a contention-based preamble is transmitted in an attempt to access the RACH.

26 Claims, 3 Drawing Sheets

(56) References Cited

U.S. PATENT DOCUMENTS

| | | | | |
|---|---|---|---|---|
| 2009/0109838 A1* | 4/2009 | Kuo | | 370/216 |
| 2009/0147768 A1* | 6/2009 | Ji et al. | | 370/350 |
| 2009/0213771 A1* | 8/2009 | Celentano et al. | | 370/310 |
| 2009/0213818 A1* | 8/2009 | Park et al. | | 370/336 |
| 2010/0118788 A1* | 5/2010 | Ohta et al. | | 370/328 |
| 2010/0220713 A1* | 9/2010 | Tynderfeldt et al. | | 370/350 |
| 2010/0260140 A1* | 10/2010 | Zhu | | 370/331 |
| 2010/0284376 A1* | 11/2010 | Park et al. | | 370/336 |
| 2011/0149942 A1* | 6/2011 | Ko et al. | | 370/343 |

OTHER PUBLICATIONS

Ericsson, "On the details of the dedicated preamble at intra-LTE handover," 3GPP TSG-RAN WG2 #58-bis, R2-072549 (Jun. 25-29, 2007).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.0.0 (Dec. 2007).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.4.0 (Dec. 2008).

Ghosh et al., "Random Access Design for UMTS Air-Interface Evolution," IEEE Vehicular Technology Conference, pp. 1041-1045 (Apr. 2007).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.1.0 (Nov. 2007).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.5.0 (Dec. 2008).

Third Generation Partnership Project, "Technical Specification Group Radio Access Network; Evolved Universal Terrestrial Radio Access (E-UTRA) and Eveolved Universal Terrestrial Radio Access Network (E-UTRAN); Overall description; Stage 2 (Release 8)," 3GPP TS 36.300 V8.3.0 (Dec. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," TS 3GPP TS 36.300 V8.7.0 (Dec. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.0.0 (Dec. 2007).

Third Generation Partnership Project, "Technical Specification Group Radio Access Network; Evolved. Universal Terrestrial Radio Access (E-UTRA) Radio Resource Control (RRC); Protocol specification (Release 8)," 3GPP TS 36.331 V8.4.0 (Dec. 2008).

\* cited by examiner

METHOD AND APPARATUS FOR ACCESSING A RANDOM ACCESS CHANNEL BY SELECTIVELY USING DEDICATED OR CONTENTION-BASED PREAMBLES DURING HANDOVER

CROSS REFERENCE TO RELATED APPLICATIONS

This application claims the benefit of U.S. Provisional Application No. 61/033,676 filed Mar. 4, 2008, which is incorporated by reference as if fully set forth.

FIELD OF INVENTION

This application is related to wireless communications.

BACKGROUND

In a Third Generation Partnership Project (3GPP) Long Term Evolution (LTE) wireless communication system, when a wireless transmit/receive unit (WTRU) performs handover to a target cell, the WTRU uses a dedicated preamble to access a network. A preamble is a signal sent from the WTRU to an evolved Node-B (eNB) to detect timing misalignment in the uplink (UL) during a handover procedure. Accordingly, the target cell needs to reserve a dedicated preamble for the WTRU. However, a non-contention based random access channel (RACH), used by the eNB to provide configuration information of the dedicated preamble, will become overloaded when a large number of WTRUs handover to the same target cell in a short amount of time. Because of this overloading of the RACH, there is a need for a more efficient mechanism by which the dedicated preamble is used during handover.

SUMMARY

The method and apparatus disclosed herein allows for an efficient usage of a dedicated preamble to access a RACH in evolved universal terrestrial radio access (E-UTRA) during handover. The WTRU may use a dedicated preamble in pre-reserved (or preconfigured) frames, but not in every frame. Alternatively, the WTRU may use contention-based preambles in other random access opportunities when a dedicated preamble is not reserved, or a RACH access attempt does not succeed using the dedicated preamble.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an evolved Node-B (eNB), a site controller, an access point (AP), or any other type of interfacing device capable of operating in a wireless environment.

The method and apparatus disclosed herein allows for an efficient usage of a dedicated preamble for handover performed by WTRUs in E-UTRA. The WTRU may use a dedicated preamble in pre-reserved (or preconfigured) frames, but not in every frame. Alternatively, the WTRU may use contention-based preambles in other random access opportunities when a dedicated preamble is not reserved.

Rather than reserving a dedicated preamble for a handover WTRU in every random access opportunity, (e.g., every 10 ms), the eNB will reserve a dedicated preamble N out of M random access opportunities, where the parameter M is defined as the period of a reserved dedicated preamble. A random access opportunity is a time period when a RACH may be accessed. In such an instance, the preferred value of N is one.

Figure 1:
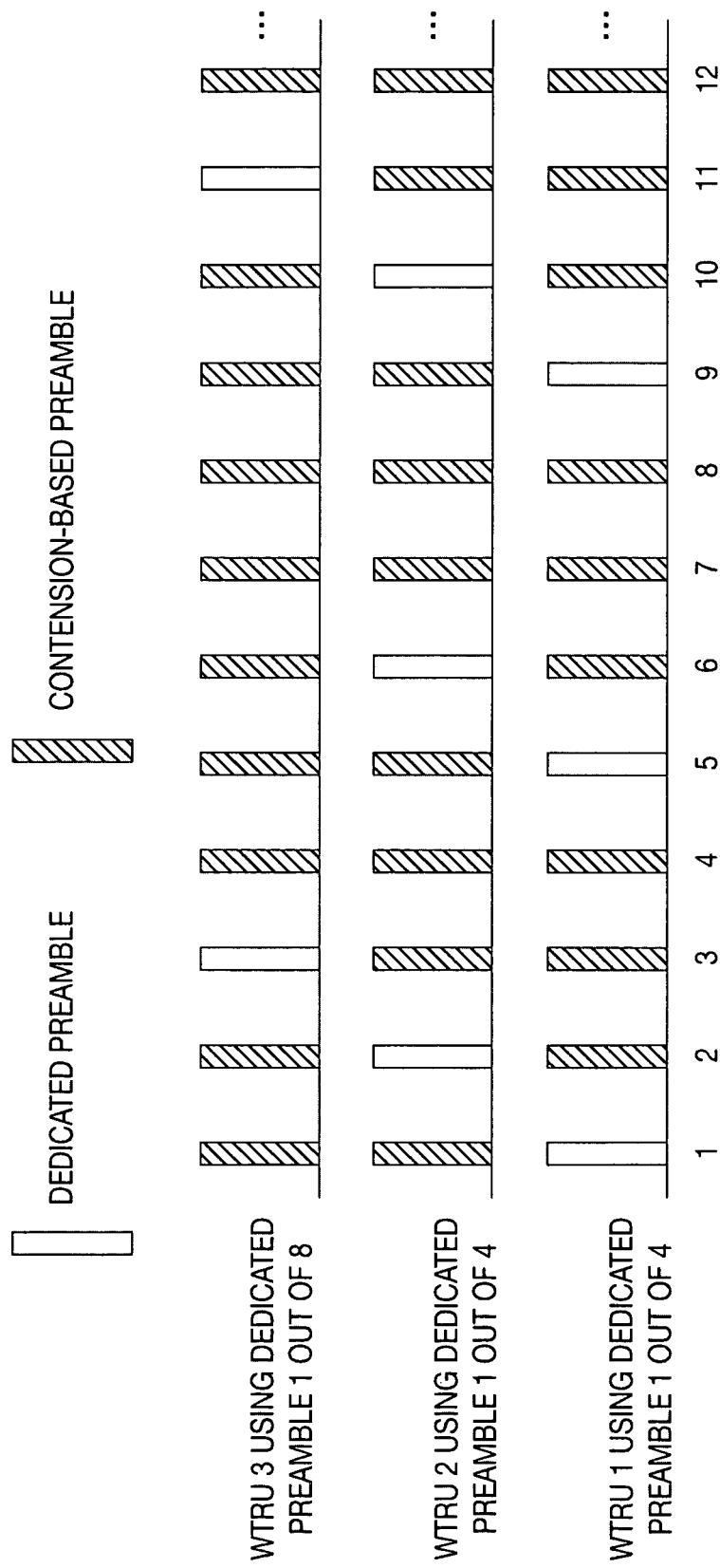
FIG. 1 shows an example of a plurality of WTRUs sharing one dedicated preamble during different reserved dedicated preamble periods.

As is shown in FIG. 1, such a value facilitates the eNB to interleave several WTRUs sharing one dedicated preamble over the time domain. WTRU 1 only uses the dedicated preamble in a first random access opportunity out of every 4 random access opportunities. WTRU 2 only uses the dedicated preamble in a second random access opportunity out of every 4 random access opportunities. WTRU 3 only uses the dedicated preamble in a third random access opportunity out of every 8 random access opportunities. Thus, a dedicated preamble is efficiently shared by 3 WTRUs in the time domain.

The network will monitor and decide the value of parameters N and M based on the load on a non-contention RACH. Although different M values may be configured, a larger period must be an integer multiple of a smaller preamble period. In this way, WTRUs with different dedicated preamble configurations may share the same preamble without collision in the time domain. An example of a preferred set of a different reserved dedicated preamble periods is M=1, 2, 4 and 8.

Figure 2:
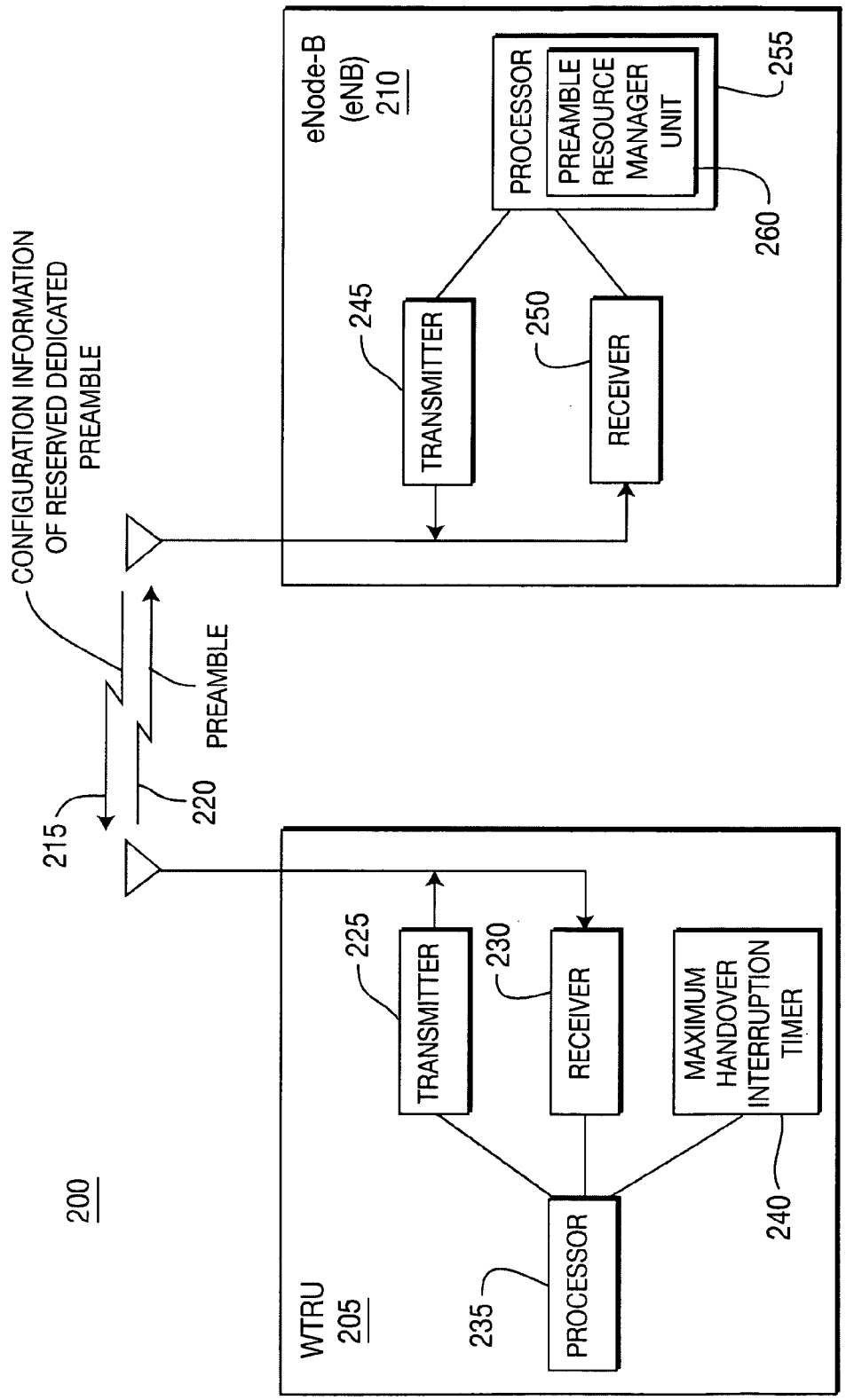
FIG. 2 is a block diagram of a wireless communication system including a WTRU and an eNB.

FIG. 2 shows a wireless communication system 200 including a WTRU 205 and an eNB 210. The eNB 210 reserves a dedicated preamble for a WTRU N out of M random access opportunities for a duration up to a maximum allowed handover interruption time. The eNB 210 may transmit reserved dedicated preamble configuration information 215 to the WTRU 205 via a handover command, when a handover decision is made, or via a special medium access control (MAC) protocol data unit (PDU). The WTRU 205 includes a transmitter 225, a receiver 230 which receives preambles from the WTRU 205, a processor 235 and a maximum handover interruption timer 240. The eNB 110 includes a transmitter 245, which is configured to transmit the reserved dedicated preamble configuration information 215, a receiver 250 which receives the preambles from the WTRU 205 and a processor 255. The processor 255 includes a preamble resource manager 260, which is used to allocate preambles to the WTRU 205.

The WTRU 205 transmits either a dedicated or contention-based preamble 220 to the eNB 210 such that the WTRU 205 can access a RACH to complete a handover procedure. If a RACH access attempt implemented by the WTRU 205 fails when using a dedicated preamble, the WTRU 205 will then use a contention-based preamble in subsequent random access opportunities until either its RACH access attempt succeeds or a random access opportunity occurs in which there is a reserved dedicated preamble.

Still referring to FIG. 2, the WTRU 200 is configured to access a RACH during handover. The processor 235 is configured to initiate handover and activate the maximum handover interruption timer 240. The transmitter is configured to transmit a dedicated preamble in an attempt to access the RACH on a condition that the dedicated preamble is reserved in a current random access opportunity and the maximum handover interruption timer has not expired, and transmit a contention-based preamble in an attempt to access the RACH on a condition that a dedicated preamble is not reserved in a current random access opportunity.

The transmitter 225 in the WTRU 200 is also configured to transmit a contention-based preamble in an attempt to access the RACH on a condition that the maximum handover interruption timer has expired. The transmitter 225 is also configured to transmit, on a condition that a failure to access a RACH has failed, a contention-based preamble in subsequent random access opportunities until a successful RACH access attempt occurs, or a random access opportunity occurs in which there is a reserved dedicated preamble.

A non-contention based procedure is used on a condition that the dedicated preamble is reserved in a current random access opportunity and the maximum handover interruption timer has not expired.

A contention-based random access procedure is used on a condition that the dedicated preamble is not reserved in a current random access opportunity and the maximum handover interruption timer has expired.

Figure 3:
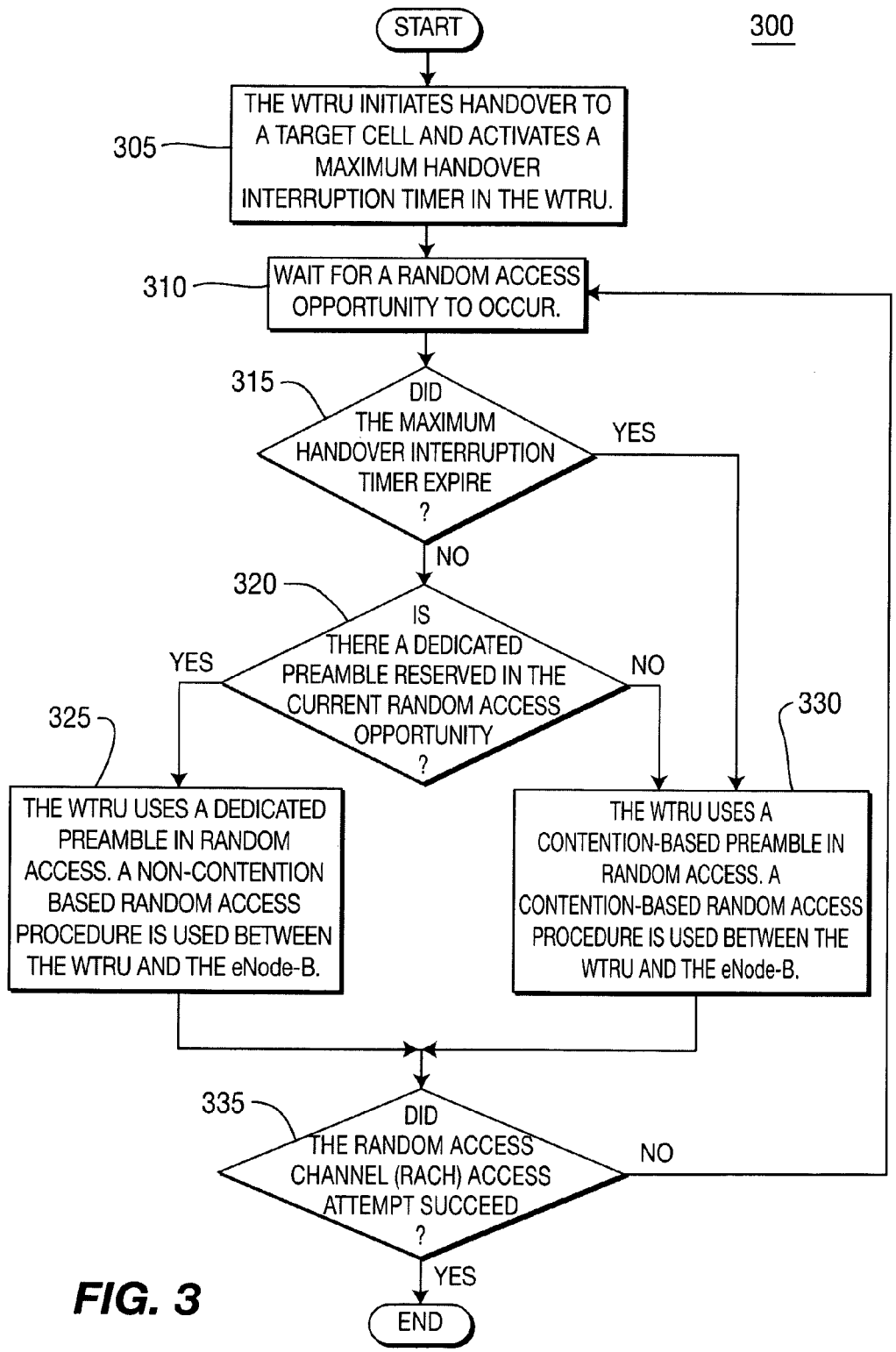
FIG. 3 is a flowchart of a procedure for using a dedicated or contention-based preamble during handover using the system of FIG. 2

FIG. 3 is a flow diagram of a procedure 300 that uses a reserved dedicated preamble or a contention-based random access preamble during handover. Referring to FIGS. 2 and 3, the processor 235 in the WTRU 205 initiates a handover to a target cell and activates the maximum handover interruption timer 240 in the WTRU 205 (305). When a random access opportunity occurs (310), a determination is made by the processor 235 as to whether the maximum handover interruption timer 240 has expired (315). If the maximum handover interruption timer 240 has not yet expired before a random access opportunity occurs, the processor 235 determines whether there is a dedicated preamble reserved in the current random access opportunity (step 320).

If there is a reserved dedicated preamble in the current random access opportunity, the WTRU uses a dedicated preamble in random access, and a non-contention based random access procedure is used between the WTRU 205 and the eNB 210 to make a RACH access attempt (step 325). A non-contention based random access procedure is two-step random access procedure that does not involve transmission of RACH message 3 in the uplink and contention resolution in the downlink, (as compared to a contention-based one).

If a reserved dedicated preamble does not exist in the current random access opportunity, the WTRU uses a contention-based preamble in random access, and a contention based random access procedure is used between the WTRU 205 and the eNB 210 to make a RACH access attempt (step 330). A contention based random access procedure is a four-step random access procedure that involves transmission of RACH message 3 in the uplink and contention resolution in the downlink. The contention-based preamble may be randomly selected from a set of contention-based preambles.

In step 335, a determination is made as to whether the RACH access attempt succeeded. If a WTRU fails its RACH access attempt using a reserved dedicated preamble, it will use a contention-based preamble in subsequent random access opportunities until either its RACH access attempt succeeds, or a random access opportunity occurs in which there is a reserved dedicated preamble.

Due to the high success probability of RACH access using a dedicated preamble, the approach to try a RACH access attempt with alternating non-contention based and contention based RACH access attempts is preamble resource efficient.

Although the features and elements of the present method and apparatus are described in particular combinations, each feature or element may be used alone, without other features and elements of the preferred embodiments, or in various combinations with or without other features and elements of the present method and apparatus.

While the present method and apparatus has been described in terms of the preferred embodiment, other variations which are within the scope of the invention will be apparent to those skilled in the art.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a WTRU, user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for random access during handover, the method comprising:

initiating a handover procedure;

receiving preamble configuration information including an indication of a dedicated preamble and a dedicated preamble period, wherein the dedicated preamble is used for random access in a cell during available random access channel (RACH) opportunities of the dedicated preamble period;

receiving a dedicated preamble reservation, wherein the dedicated preamble reservation indicates a subset of the available RACH opportunities of the dedicated preamble period during which the dedicated preamble is reserved for the WTRU; and transmitting the dedicated preamble during a RACH opportunity selected from the subset of the available RACH opportunities of the dedicated preamble period based on the dedicated preamble reservation.

2. The method of claim 1 further comprising:
determining that a maximum handover interruption timer has expired; and
transmitting a contention-based preamble.

3. A wireless transmit/receive unit (WTRU), the WTRU comprising:
a processor configured to initiate a handover procedure;
a receiver configured to receive preamble configuration information including an indication of a dedicated preamble and a dedicated preamble period, wherein the dedicated preamble is used for random access in a cell during available random access channel (RACH) opportunities of the dedicated preamble period, and to receive a dedicated preamble reservation, wherein the dedicated preamble reservation indicates a subset of the available RACH opportunities of the dedicated preamble period during which the dedicated preamble is reserved for the WTRU; and
a transmitter configured to transmit the dedicated preamble during a RACH opportunity selected from of the subset of the available RACH opportunities of the dedicated preamble period based on the dedicated preamble reservation.

4. The WTRU of claim 3 wherein the transmitter is configured to transmit a contention-based preamble on a condition that a maximum handover interruption timer has expired.

5. The method of claim 1, further comprising:
activating a maximum handover interruption timer in the WTRU; and
transmitting the dedicated preamble on a condition that the maximum handover interruption timer has not expired.

6. The method of claim 5, wherein the dedicated preamble period ends when the maximum handover interruption timer has expired.

7. The method of claim 1, wherein the available RACH opportunities of the dedicated preamble period is an integer M number of RACH opportunities and the subset of the available RACH opportunities of the dedicated preamble period is an integer N number of RACH opportunities, wherein N is less than M.

8. The method of claim 1, further comprising:
a second WTRU receiving a different dedicated preamble reservation, wherein the different dedicated preamble reservation indicates a different subset of RACH opportunities of the dedicated preamble period;
the second WTRU transmitting the dedicated preamble during a RACH opportunity selected from the different subset of RACH opportunities of the dedicated preamble period based on the different dedicated preamble reservation.

9. The method of claim 1, wherein the preamble configuration information is common to all WTRUs of a cell, and wherein the dedicated preamble reservation is only for a single WTRU of the cell.

10. The WTRU of claim 3, further comprising:
a maximum handover interruption timer; and
the transmitter further configured to transmit the dedicated preamble on a condition that the maximum handover interruption timer has not expired.

11. The WTRU of claim 10, wherein the dedicated preamble period ends when the maximum handover interruption timer has expired.

12. The WTRU of claim 3, wherein the available RACH opportunities of the dedicated preamble period is an integer M number of RACH opportunities and the subset of the available RACH opportunities of the dedicated preamble period is an integer N number of RACH opportunities, wherein N is less than M.

13. The WTRU of claim 3, wherein the preamble configuration information is common to all WTRUs of a cell, and wherein the dedicated preamble reservation is only for a single WTRU of the cell.

14. A method for managing random access of wireless transmit/receive units (WTRUs) in a cell, the method comprising:
transmitting preamble configuration information including an indication of a dedicated preamble and a dedicated preamble period, wherein the dedicated preamble is used for random access channel (RACH) access in the cell during available random access channel (RACH) opportunities of the dedicated preamble period; and
transmitting a first dedicated preamble reservation to a first WTRU, wherein the first dedicated preamble reservation indicates a first subset of the available RACH opportunities of the dedicated preamble period during which the dedicated preamble is reserved for the first WTRU.

15. The method of claim 14, further comprising receiving the dedicated preamble from the first WTRU during a RACH opportunity selected from the first subset of the available RACH opportunities of the dedicated preamble period.

16. The method of claim 14, further comprising transmitting a second dedicated preamble reservation to a second WTRU, wherein the second dedicated preamble reservation indicates a second subset of the available RACH opportunities of the dedicated preamble period different than the first subset during which the dedicated preamble is reserved for the second WTRU.

17. The method of claim 16, further comprising receiving the dedicated preamble from the second WTRU during a RACH opportunity of selected from the second subset of the available RACH opportunities of the dedicated preamble period.

18. The method of claim 14, wherein the available RACH opportunities of the dedicated preamble period is an integer M number of RACH opportunities and the subset of the available RACH opportunities of the dedicated preamble period is an integer N number of RACH opportunities, wherein N is less than M.

19. The method of claim 14, wherein the preamble configuration information is common to all WTRUs of a cell, and wherein the first dedicated preamble reservation is only for the first WTRU.

20. The method of claim 16, wherein the preamble configuration information is common to all WTRUs of a cell, and wherein the second dedicated preamble reservation is only for the second WTRU.

21. A method implemented in a wireless transmit/receive unit (WTRU) for random access during handover, the method comprising:
receiving a handover command, the handover command having dedicated preamble configuration information including an indication of a dedicated preamble and an indication of random access channel (RACH) opportunities during which the dedicated preamble is reserved for the WTRU;
initiating a timer in response to the handover command;

transmitting, on a condition that the timer has not expired, the indicated dedicated preamble during a RACH opportunity selected from the indicated RACH opportunities for the dedicated preamble; and transmitting, subsequent to expiration of the timer and on a condition that RACH access using the dedicated preamble was not successful, a contention based preamble during a RACH opportunity selected from RACH opportunities for the contention based preamble.

22. The method of claim 21, wherein the transmitting the indicated dedicated preamble further includes transmitting the indicated dedicated preamble interleaved over the time domain with at least one other WTRU.

23. The method of claim 21, wherein the indicated dedicated preamble is not reserved for the WTRU in every frame.

24. A wireless transmit/receive unit (WTRU), the WTRU comprising:

a receiver configured to receive a handover command, the handover command having dedicated preamble configuration information including an indication of a dedicated preamble and an indication of random access channel (RACH) opportunities during which the dedicated preamble is reserved for the WTRU;

a timer configured to initiate in response to the handover command; and a transmitter configured to:

transmit, on a condition that the timer has not expired, the indicated dedicated preamble during a RACH opportunity selected from the indicated RACH opportunities for the dedicated preamble; and transmit, subsequent to expiration of the timer and on a condition that RACH access using the dedicated preamble was not successful, a contention based preamble during a RACH opportunity selected from RACH opportunities for the contention based preamble.

25. The WTRU of claim 24, wherein the transmitter is further configured to transmit, on a condition that the timer has not expired, the indicated dedicated preamble interleaved over the time domain with at least one other WTRU.

26. The WTRU of claim 24, wherein the indicated dedicated preamble is not reserved for the WTRU in every frame.

* * * * *

UNITED STATES PATENT AND TRADEMARK OFFICE
CERTIFICATE OF CORRECTION

PATENT NO. : 8,649,353 B2  
APPLICATION NO. : 12/392235  
DATED : February 11, 2014  
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this
Twelfth Day of May, 2015

Michelle K. Lee
*Director of the United States Patent and Trademark Office*